(12) United States Patent
Levin

(10) Patent No.: US 7,524,190 B2
(45) Date of Patent: Apr. 28, 2009

(54) FABRIC-WRAPPED CRAFT WIRE AND PROCESS FOR MANUFACTURING SAME

(75) Inventor: Susan Levin, Ventura, CA (US)

(73) Assignee: K1C2, Ventura, CA (US)

( * ) Notice: Subject to any disclaimer, the term of this patent is extended or adjusted under 35 U.S.C. 154(b) by 559 days.

(21) Appl. No.: 11/307,279

(22) Filed: Jan. 30, 2006

(65) Prior Publication Data
US 2007/0207446 A1 Sep. 6, 2007

(51) Int. Cl.
*G09B 11/00* (2006.01)
(52) U.S. Cl. ........................................................ 434/83
(58) Field of Classification Search ............... 434/81, 434/82, 83, 96, 97; 428/36.3
See application file for complete search history.

(56) References Cited

U.S. PATENT DOCUMENTS

| 4,106,234 | A  |   | 8/1978  | Gallo              |          |
|-----------|----|---|---------|--------------------|----------|
| 4,620,649 | A  | * | 11/1986 | Graham             | 223/40   |
| 5,099,604 | A  |   | 3/1992  | Gallo              |          |
| 5,127,783 | A  | * | 7/1992  | Moghe et al.       | 411/411  |
| 5,281,454 | A  | * | 1/1994  | Hanson             | 428/36.3 |
| 6,260,559 | B1 | * | 7/2001  | Schirren et al.    | 132/275  |
| 7,240,710 | B2 | * | 7/2007  | Hrycyk et al.      | 152/540  |

* cited by examiner

*Primary Examiner*—Kurt Fernstrom
(74) *Attorney, Agent, or Firm*—Kelly Lowry & Kelley, LLP

(57) ABSTRACT

A decorative wire is formed by providing a length of thin, bendable wire that serves as the foundation of the decorative wire. A fabric having a straight grain is selected and the fabric is cut biased to the straight grain. The fabric is spiral wound along the length of the bendable wire. The fabric adheres to the wire as the fabric is wrapped around the bendable wire. One example of a decorative wire formed by the above process includes a length of thin, bendable wire where a plurality of elongated strips of fabric are spiral wound along the length of the bendable wire and adhesively connected thereto. Each strip of fabric includes an abraded edge formed while the strip is wrapped around the bendable wire.

22 Claims, 3 Drawing Sheets

FABRIC-WRAPPED CRAFT WIRE AND PROCESS FOR MANUFACTURING SAME

BACKGROUND OF THE INVENTION

The present invention relates generally to craft wire. More particularly, the present invention relates to fabric-wrapped craft wire.

Arts and crafts are very popular activities among people of all ages and backgrounds. Craft wire is used in a variety of arts and crafts decorating activities such as scrapbooking, jewelry-making, toy-making, card-making, costume-making, etc. A particular form of craft wire used in these projects is called a "chenille stem". Typically, the chenille stem resembles an old-fashioned pipe cleaner where wire has been twisted along its length around individual cotton fibers or the like to retain those fibers in order to create a craft wire with a soft, fuzzy feel. Another type of stem is the so-called "tinsel stem" where wire has been twisted along its length around tinsel material to create a craft wire with a metallic, shiny look. However, the stems described above have certain disadvantages. The chenille stems are generally mono-colored and lack a variety of complex patterns since the stems are formed using individual material fibers rather than a fabric. Another disadvantage is that twisting the wire requires that a greater length of wire must be used to create a finished stem of a certain length.

Various attempts have been made to incorporate chenille stems and wire into decorative objects. For example, U.S. Pat. No. 5,099,604 discloses an artificial stem for a natural cut flower that uses a chenille wire as the stem. However, the artificial stem suffers from the same disadvantages as described above, especially since the stem must be mono-colored to maintain resemblance to a natural flower stem. In another example, U.S. Pat. No. 4,106,234 also discloses an artificial stem assembly for a short stem cut flower. However, the artificial stem requires an exterior tube, a flocked wire positioned within the tube, and a length of water absorbent cotton wrapped around the flocked wire with the artificial stem only being intended to provide a mechanism for transporting water to the natural cut flower.

Accordingly, there is a need for a decorative craft wire that provides a chenille feel using a fabric instead of individual fibers. There is an additional need for a decorative craft wire that provides a spiral wrapping look. There is also a need for a decorative craft wire that provides a chenille feel while using less wire than conventional twisted wire chenille stems. There is a further need for a decorative craft wire that provides a chenille feel with a choice of a type of fabric material and/or fabric pattern. There is an additional need for a decorative craft wire that provides a chenille feel with a choice of fabric color and/or color pattern. There is a need for a decorative craft wire that provides color patterns disposed between fluffy portions along the length of the decorative craft wire. The present invention fulfills these needs and provides other related advantages.

SUMMARY OF THE INVENTION

The present invention resides in a process and apparatus that provides a fabric-wrapped craft wire with a chenille feel.

The process for creating decorative wire includes the step of providing a length of thin, bendable wire which serves as the foundation of the decorative wire. A fabric is selected by a user to be used in conjunction with the bendable wire. Various fabrics may be used including, without limitation, a printed fabric. The chosen fabric should preferably have a straight grain. The fabric is cut by the user on a bias to the straight grain as fabric cut on the bias has more stretch than fabric cut on the straight of grain. This is a useful quality as the fabric is spiral wound along the length of the bendable wire. As the fabric is wound along the wire, the fabric is adhered to the bendable wire due to adhesive placed on the wire.

Various gauges of bendable wire may be utilized to form the decorative wire including, without limitation, twenty two, twenty four, or twenty six gauge wire.

As part of the step of selecting the fabric, a type of fabric material and a fabric pattern are also chosen by the user. The user also selects the fabric for color and/or color intensity. In particular, for maximum visual interest, a preferred fabric pattern selection includes four or more colors and a plurality of shaped objects. When a subdued result is desired, a single color, low contrast colors or a series of monochromatic colors may be substituted. In all cases the shaped objects have perimeters formed by a combination of curved and angular lines where a number of the shaped objects overlap and the remaining shaped objects are non-overlapping with other shaped objects.

When the fabric is cut, the user can also cut the fabric into a number of elongated strips that are cut on bias to the straight of the grain. An edge of the strip of fabric is abraded by the user as the fabric is spiral wound along the length of the bendable wire in order to create an appearance of a frayed edge along the length of the decorative wire. About two inches of the cut fabric are spiral wound over about one inch of the bendable wire. When the fabric is adhered to the bendable wire, only non-frayed portions of the fabric are adhesively attached to the bendable wire. The abraded edge provides a chenille feel to the decorative wire.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
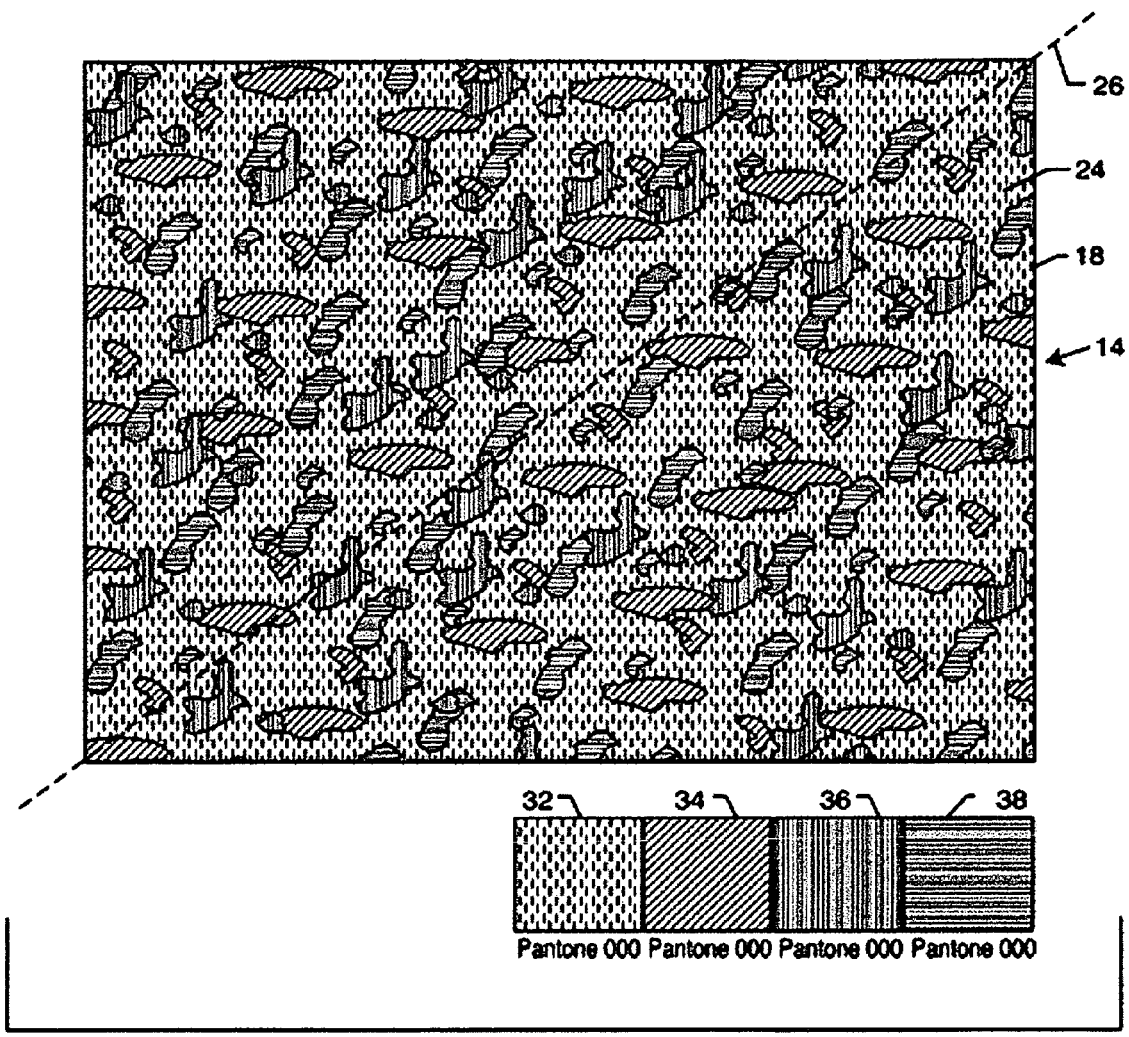
FIG. 1 is a top plan view of a printed fabric (including several illustrative fabric color selections) of a type used in the process of making an embodiment of the present invention where a bias line is shown across the fabric.
Figure 2:
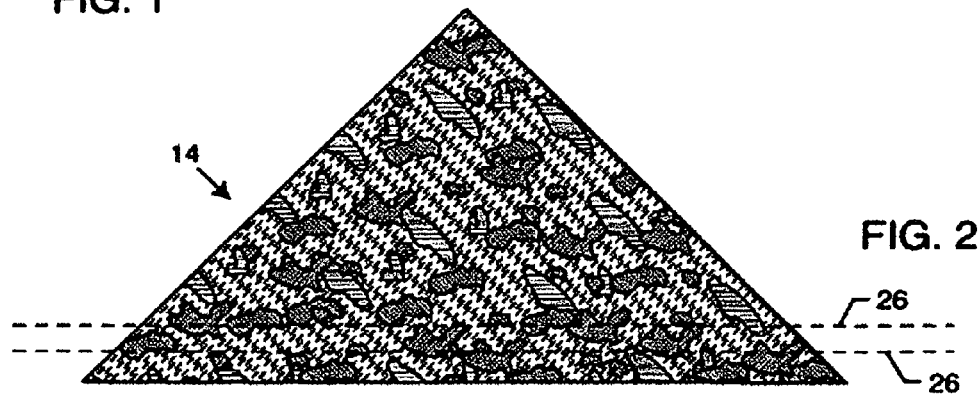
FIG. 2 is a top plan view of the printed fabric of FIG. 1 in a folded configuration with a bias line.
Figure 3:
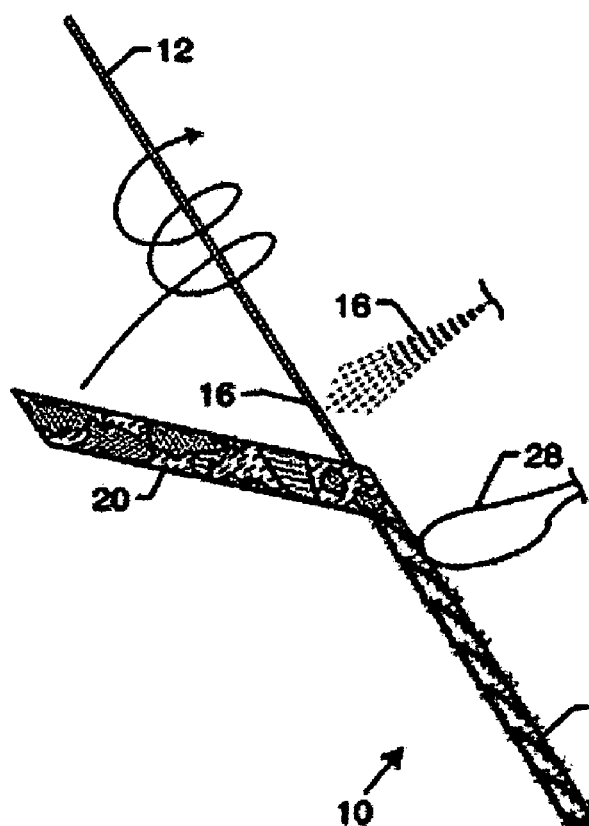
FIG. 3 is a perspective view of a partially completed decorative wire embodying the present invention and illustrating the process of spiral winding the fabric over a bendable wire.
Figure 4:
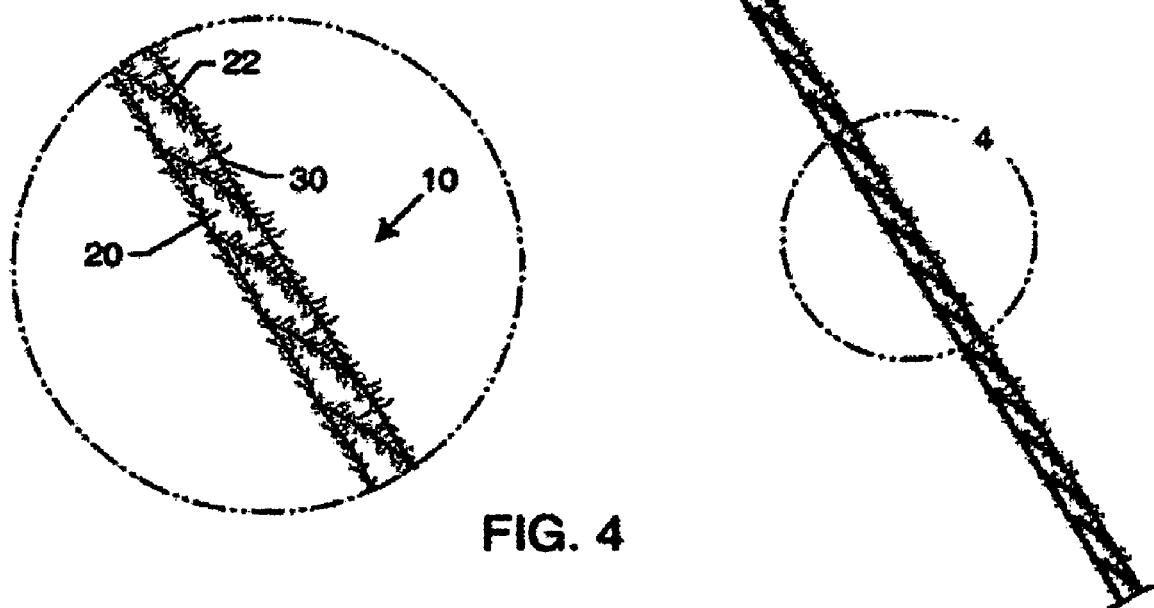
FIG. 4 is an exploded view taken along line 4-4 of FIG. 3 showing the fabric spiral wound over the bendable wire.

As shown in FIGS. 1-5 for purposes of illustration, the present invention is concerned with a process and apparatus that provides a fabric-wrapped craft wire with a fluffy, chenille-like feel.

FIGS. 1-4 illustrate a decorative wire 10 that is formed from a length of thin, bendable wire base 12, fabric 14 and a glue or adhesive 16 for joining the wire base 12 and fabric 14 together. The adhesive 16 can be selected from a variety of conventional adhesives that are for the purpose of bonding metal, glass, vinyl, etc., to the fabric 14 such that the fabric 14 can be washed without destroying the bond.

The wire base 12 may be a desired length of wire selected from various gauges of wire including, but not limited to twenty two, twenty four, twenty six gauge wire or the like. Preferably, the wire base 12 is in the form of conventional craft wire although various types of electrical wire and/or cable may also be used. Lighter gauge wire tends to be more useful for creating more delicate decorative wires 10 (e.g., for fine details on jewelry, costumes or the like) while heavier gauge wire tends to be more useful for creating sturdier supportive decorative wires 10 (e.g., for more structurally supportive features on sculptures, costumes or the like). The appearance of the wire base 12 may be a plain, 'natural' color of the processed metal from which the wire is made or an electroplated color.

Various types, colors and patterns (e.g., fabric pattern, color pattern, or the like) of fabrics 14 may be used including, without limitation, a printed fabric that preferably includes a pattern permitting the appearance of the decorative wire 10 to be varied by adjusting the colors and intensity of the colors in the printed fabric. The fabric 14 is a pliable material made through various processes including, without limitation, weaving, felting, or knitting natural or synthetic fibers and filaments. The fabric 14 includes a straight grain 24 formed by the individual material fibers used to create the fabric 14. The fabric pattern may be created though various means including, but not limited to, a printed pattern, a woven pattern or the like.

A piece 18 of the fabric 14 is spiral wound and/or wrapped around the wire base 12 to create the decorative wire 10. Preferably, the piece 18 of the fabric 14 is cut along lines 26 biased to the straight grain 24 in order to form a plurality of smaller, elongated strips 20 of the fabric 14. Fabric 14 cut on the bias 26 has more stretch and flexibility than fabric 14 cut on the straight of grain 24. One of the inherent qualities of bias cut fabric 14 is the flexibility of the fabric 14 and ability to be manipulated. The bias cut fabric 14 is stretchy as a simple push-pull motion and flexible in providing movement in all directions. A single strip 20 or a consecutive number of strips 20 may then be spiral wound wrapped along the length of the bendable wire 12 and adhesively connected thereto.

Each of the strips 20 of the fabric 14 includes at least one frayed or abraded edge 22 along one side of the strip 20. The edge 22 is frayed by an abrading tool 28 (preferably having a rounded but dull edge to rub against the edge 22) or, alternatively, a thumb or finger of a person making the wire 10 by rubbing the tool 28 or thumb back and forth against the edge 22 of the fabric 14. This leaves a central portion of the strip 20 that is not frayed. Only the non-frayed portions of the strips 20 are adhesively connected to the wire base 12 in order to allow the abraded edges 22 of the strips 20 to remain soft to the touch and unbound to the wire base 12. Preferably, each elongated strip 20 comprises a three eighths inch wide strip 20 of the fabric 14. The length of the strip 20 can vary depending on the dimensions of the piece 18 of fabric 14 from which the strips 20 are cut. About two inches length of one of the elongated strips 20 of the fabric 14 covers an inch of length of the decorative wire 10. Thus, the combined length of the strip(s) 20 used to cover a particular length of wire 12 should be approximately at least twice that of the length of wire 12 for each decorative wire 10.

Various fabrics 14 can be used, including, without limitation, cotton fabrics, polyester/cotton blends, rayon, silk or the like. For optimum fraying, the fabric 14 should be a medium grade one hundred percent cotton fabric although fabrics that are very tightly woven (e.g., batiks, quality sheeting or the like) which may fray only a little while loosely woven fabrics that fray a great deal may be useful for various decorative touches. For example, a loosely woven fabric may be used where a user desires to show off the color of the wire base 12 as fibers 30 of the fabric 14 will be apart enough to show the color of the wire base 12. The fabric 14 should preferably be a soft fabric that frays easily when cut on the bias. Fabric 14 is often treated with sizing to give the fabric 14 a shiny, crisp finish. The sizing can be washed out to get the fabric 14 softer.

Small prints with overall patterns (see FIGS. 1 and 2) work best for cutting the fabric 14 into narrow strips 20 that show the right blend of colors. In particular, a preferred fabric pattern includes at least four colors and various randomly shaped objects where the objects have a perimeter formed by a random combination of curved and angular lines that appear in a random yet fairly evenly distributed pattern reminiscent of a multi-colored Jackson Pollack-style painting; a number of the shaped objects overlapping and the remaining shaped objects being non-overlapping with other shaped objects. Several fabric colors 32, 34, 36, 38 are illustrated the shaped objects shown in FIG. 1. The fabric patterns include various details including, without limitation, irregular shapes, symmetrical shapes, polygons, plaids, paisleys, checkers, stripes, polka dots, holiday themes (e.g., Christmas Trees, Valentine's Day Hearts, etc.) or the like. The number of colors used in a pattern is variable. For example, if the desire is to have a multi-color pattern, multiple colors are obviously needed. However, in some cases, if a single color pattern or a pattern with a monochromatic range of values is desired, then only a single color will be used or a color that includes a range of values. It should be kept in mind that graphic designers often speak about four colors because that is what a conventional printing press can print in one press instead of the more accurate "full color". However, more than four colors may be achieved in one pass by combining the four process colors inks (i.e., cyan, magenta, yellow and black) to create a wide range of colors in one press. The fabric (or paper) can also be run through a press more than once or have additional elements added after printing. For maximum visual interest, four or more colors formed by a combination of curved and angular lines are part of the fabric pattern. For subdued results, the procedures outlined above may be used with a single color, low contrast colors, or a series of monochromatic or analogous colors being substituted.

Figure 5:
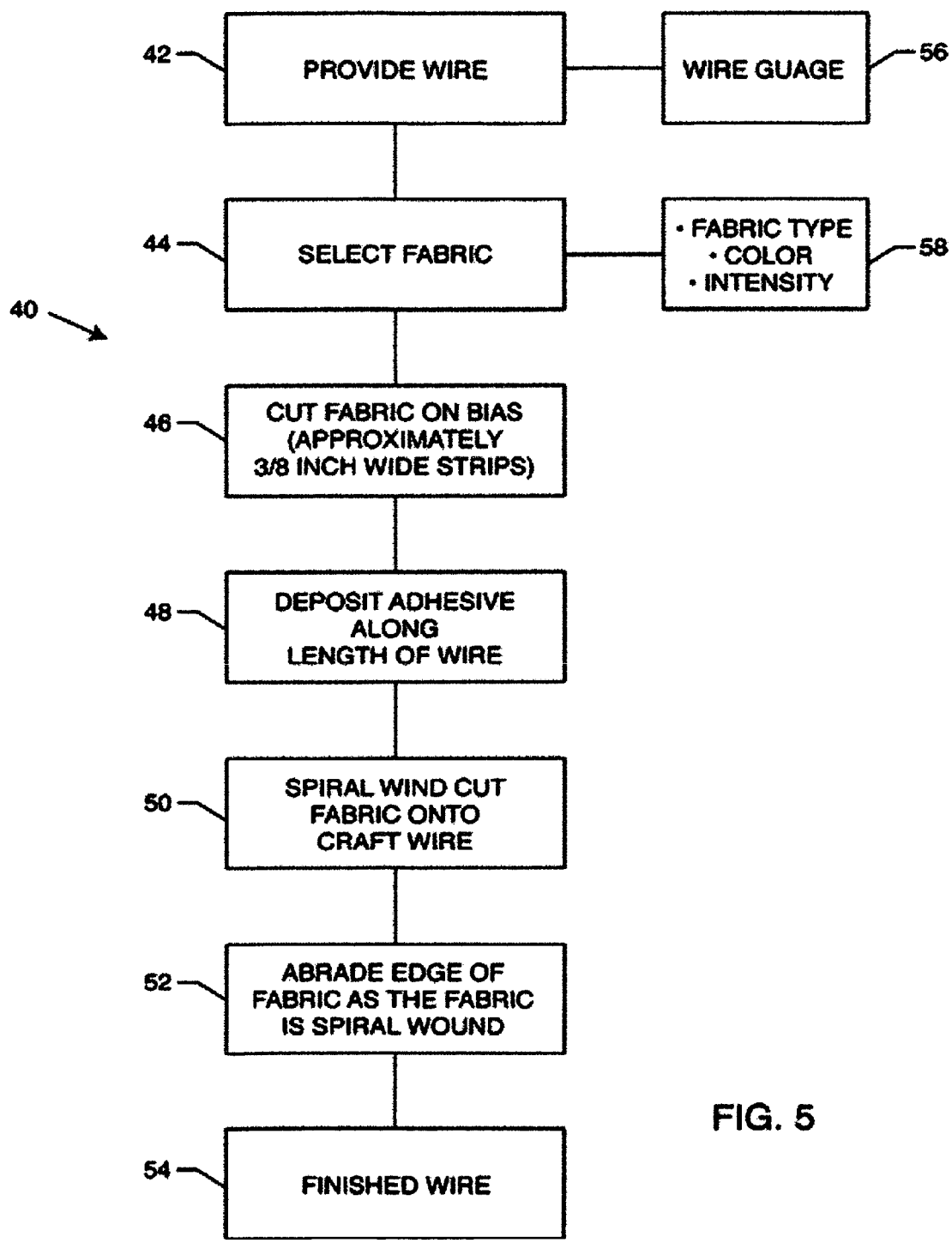
FIG. 5 is a flowchart illustrating the process for creating the decorative wire.

As seen in FIG. 5, a process 40 for creating a length of decorative wire 10 includes providing 42 a length of the thin, bendable wire base 12. A fabric 14 having a straight grain 24 is selected 44 and the fabric is then cut 46 along a line biased 26 to the straight grain 24. Regular scissors or a rotary wheel can be used for cutting 46 the fabric 14 on an individual basis while cutting machines can be used to cut many layers of fabric 14 at once for mass-production commercial applications. When the fabric 14 is cut 46, the fabric 14 is also cut into the elongated strip(s) 20.

An adhesive 16 is deposited 48 along the length of wire 12. The adhesive 16 may be deposited 48 by various means including, without limitation, brushing, spraying or the like. The cut strip(s) 20 of fabric 14 is spiral wound 50 along the length of the bendable wire base 12 and the fabric 14 adheres to the bendable wire base 12.

As outlined above, an edge 22 of the strip(s) 20 of fabric 14 is abraded 52 by an abrading tool 28 or thumb as the fabric 14 is spiral wound wrapped along the length of the bendable wire base 12 in order to create a frayed edge 22. The fabric 14 is spiral wound while holding the fabric 14 at an angle and slightly abrading 52 the fabric by the abrading tool 28 or thumb each time the fabric 14 is twisted around the wire base 12. This makes the fabric edge 22 fray more evenly. Only non-frayed portions of the fabric 14 are adhesively attached to the bendable wire base 12 because, in order to fray properly, the fluffy abraded "chenille" edge 22 can not have adhesive 16 binding together individual fibers 30 of the fabric 14 at the edge 22.

About two inches of the cut fabric 14 are spiral wound over about one inch of the bendable wire base 12. In order to create a finished 54 decorated wire 10, the combined length of the strip(s) 20 used to cover a particular length of wire base 12 should be approximately at least twice that of the length of wire base 12 for each decorative wire 10 (i.e., about twenty inches of fabric 14 makes about ten inches of covered, decorative wire 10). Based on a forty four inch wide fabric 14, it would take approximately five hundred twenty five yards of fabric 14 to wind 10,000 cards that each had three yards of decorative wire 10 on them.

A user chooses 56 the wire base 12 from various gauges of wire including, without limitation, twenty two, twenty four, twenty six gauge wire or the like. As part of selecting 44 the fabric 14, a type of fabric material, fabric pattern, fabric color and color intensity are also selected 58.

The above-described embodiment of the present invention is illustrative only and not limiting. It will thus be apparent to those skilled in the art that various changes and modifications may be made without departing from this invention in its broader aspects. Therefore, the appended claims encompass all such changes and modifications as falling within the true spirit and scope of this invention.

What is claimed is:

1. A process for creating decorative wire, comprising the steps of:
   providing a length of thin, bendable wire;
   selecting a fabric having a straight grain;
   cutting the fabric biased to the straight grain;
   spiral winding the fabric along the length of the bendable wire;
   abrading an edge of the fabric as the fabric is spiral wound along the length of the bendable wire, to create a frayed edge; and
   adhering the fabric to the bendable wire by adhesively attaching only non-frayed portions of the fabric to the bendable wire.

2. The process of claim 1, wherein the providing step includes the step of utilizing twenty two, twenty four, or twenty six gauge wire.

3. The process of claim 1, wherein the selecting step includes the steps of choosing a type of fabric material and a fabric pattern.

4. The process of claim 3, wherein the selecting step includes the step of selecting a fabric color or color intensity.

5. The process of claim 3, wherein the fabric pattern choosing step includes the step of selecting a fabric pattern including at least four colors and a plurality of shaped objects having perimeters formed by a combination of curved and angular lines wherein a number of the shaped objects overlap and the remaining shaped objects are non-overlapping with other shaped objects.

6. The process of claim 1, wherein the cutting step includes the step of cutting the fabric into elongated strips.

7. The process of claim 1, wherein the spiral winding step includes the step of winding about two inches of the cut fabric over about one inch of the bendable wire.

8. A process for creating decorative wire, comprising the steps of:
   providing a length of thin, bendable wire;
   selecting a fabric having a straight grain;
   cutting the fabric into elongated strips biased to the straight grain;
   abrading an edge of each strip as the fabric is spiral wound along the length of the bendable wire, to create a frayed edge;
   spiral winding the fabric along the length of the bendable wire; and
   adhering the fabric to the wire by adhesively attaching only non-frayed portions of the fabric to the wire.

9. The process of claim 8, wherein the spiral winding step includes the step of winding about two inches of the cut fabric over about one inch of the bendable wire.

10. The process of claim 8, wherein the providing step includes the step of utilizing twenty two, twenty four, or twenty six gauge wire.

11. The process of claim 8, wherein the selecting step includes the steps of choosing a type of fabric material and a fabric pattern, and selecting a fabric color or color intensity.

12. The process of claim 11, wherein the fabric pattern choosing step includes the step of selecting a fabric pattern including at least four colors and a plurality of shaped objects having perimeters formed by a combination of curved and angular lines wherein a number of the shaped objects overlap and the remaining shaped objects are non-overlapping with other shaped objects.

13. A decorative wire, comprising:
   a length of thin, bendable wire; and
   a plurality of elongated strips of fabric spiral wound along the length of the bendable wire and adhesively connected thereto;
   wherein the strips of fabric include an abraded edge; and
   wherein only non-frayed portions of the strips are adhesively connected to the bendable wire.

14. The wire of claim 13, wherein the bendable wire comprises 22, 24 or 26 gauge wire.

15. The wire of claim 13, wherein the fabric comprises a printed fabric.

16. The wire of claim 15, wherein the printed fabric includes a pattern permitting appearance of the decorative wire to be varied by adjusting colors and intensity of colors in the printed fabric.

17. The wire of claim 15, wherein the printed fabric includes a pattern having at least four colors and a plurality of shaped objects having perimeters formed by a combination of curved and angular lines wherein a number of the shaped objects overlap and the remaining shaped objects are non-overlapping with other shaped objects.

18. The wire of claim 13, wherein about two inches length of one of the elongated strips of fabric covers an inch of length of the decorative wire.

19. A decorative wire, comprising:
   a length of thin, bendable wire; and
   a plurality of elongated strips of a printed fabric spiral wound along the length of the bendable wire and adhesively connected thereto;
   wherein the strips of fabric include an abraded edge, the printed fabric includes a pattern permitting appearance of the decorative wire to be varied by adjusting colors and intensity of colors in the printed fabric, and only non-frayed portions of the strips are adhesively connected to the wire.

20. The wire of claim 19, wherein the bendable wire comprises twenty two, twenty four, or twenty six gauge wire.

21. The wire of claim 19, wherein about two inches length of one of the elongated strips of fabric covers an inch of length of the decorative wire.

22. The wire of claim 19, wherein the pattern of the printed fabric includes at least four colors and a plurality of shaped objects having perimeters formed by a combination of curved and angular lines wherein a number of the shaped objects overlap and the remaining shaped objects are non-overlapping with other shaped objects.

* * * * *